United States Patent [19]

Selvarajan et al.

[11] Patent Number: 5,837,776
[45] Date of Patent: Nov. 17, 1998

[54] PROCESS FOR PRODUCING WATER SOLUBLE ANIONIC DISPERSION POLYMERS

[75] Inventors: Radhakrishnan Selvarajan, Downers Grove; John R. Hurlock, Hickory Hills, both of Ill.

[73] Assignee: Nalco Chemical Company, Naperville, Ill.

[21] Appl. No.: 781,646

[22] Filed: Jan. 10, 1997

Related U.S. Application Data

[63] Continuation-in-part of Ser. No. 620,051, Mar. 20, 1996, Pat. No. 5,605,970.

[51] Int. Cl.$^6$ ..................................................... C08F 2/16
[52] U.S. Cl. ........................... 525/244; 525/255; 525/261; 525/260; 525/274; 525/266; 525/301; 525/308; 525/309; 526/210; 526/234; 526/240; 526/318.4; 526/328

[58] Field of Search ..................................... 525/244, 255, 525/260, 261, 266, 277, 301, 308, 309; 526/210, 234, 240, 318.4, 328

[56] References Cited

U.S. PATENT DOCUMENTS

| | | | |
|---|---|---|---|
| 3,493,500 | 2/1970 | Volk et al. | 210/54 |
| 4,929,655 | 5/1990 | Takedo et al. | 524/458 |
| 5,006,590 | 4/1991 | Takedo et al. | 524/458 |
| 5,373,066 | 12/1994 | Rebre et al. | 525/387 |
| 5,605,970 | 2/1997 | Selvarajan | 525/274 |

*Primary Examiner*—James J. Seidleck
*Attorney, Agent, or Firm*—Robert A. Miller; Kelly L. Cummings

[57] ABSTRACT

Aqueous dispersions of water soluble nonionic and anionically charged vinyl and allyl addition polymers can be obtained by polymerizing in the presence of an anionically charged water soluble polymer stabilizer in a saturated salt solution. Methods for the preparation of these polymers, and their compositions are disclosed.

18 Claims, No Drawings

PROCESS FOR PRODUCING WATER SOLUBLE ANIONIC DISPERSION POLYMERS

This application is a continuation-in-part of application Ser. No. 08/620,051 filed Mar. 20, 1996 now U.S. Pat. No. 5,605,970.

BACKGROUND OF THE INVENTION

Field of the Invention

This invention is related to a composition, and a process of preparing nonionic and anionically charged water soluble polymers in the form of finely divided particles of the polymer in an aqueous salt media. The polymers are useful as flocculants, retention and drainage aids in the manufacture of paper, and for other uses.

Introduction

One of the problems that has confronted industry in the use of water soluble polymer flocculants is how to dissolve the polymer into water so that it can be utilized for its intended purpose. Early water soluble polymers were provided as dilute aqueous solutions. As the technology improved, and the molecular weights of the polymers were improved, it became increasingly difficult for manufacturers to ship these polymers in solution form because of the high viscosity of even one-half to one percent solutions of the polymers. Manufacturers accordingly started shipping the polymers in the form of commutated solids which could be dissolved into water using various mechanical means. While solving shipment problems, some mechanical means degraded the polymers through shear, and, incomplete dissolution of water soluble polymers, the formation of swollen translucent particles, was common. This led to a waste of polymer, and in some cases, detrimental results such as in the case of so called "fish-eye" particles which caused defects in the manufacture of paper. In the early 1970's water-in-oil emulsions of water soluble polymers were introduced. Using the water-in-oil technology, high molecular weight polymers that rapidly dissolved could be produced, and this technology achieved great acceptance in the water soluble polymer industry. A disadvantage of the water-in-oil emulsion polymer technology however is that the emulsions contain substantial quantities of hydrocarbon liquid. The introduction of hydrocarbon liquids into the systems where these water soluble polymers are used is not always beneficial.

U.S. Pat. No. 4,929,655 and U.S. Pat. No. 5,006,590 issued to Kyoritsu Yuki Co. Ltd. describe and claim a method for the production of dispersions of water soluble cationic polymers. These polymers were manufactured in an aqueous salt or brine solution in which the polymer was insoluble. The disclosure of these two patents is hereinafter incorporated by reference into this specification. The process yielded dispersions of high molecular weight polymers which when added to water would completely dissolve over a relatively short period of time. While an advance to the art, the invention was practical only for dispersions of cationically charged water soluble polymers containing at least a portion of a hydrophobically modified cationic monomer. Anionically charged water soluble polymers, those typically useful as flocculants and as drainage and retention aids in the manufacture of paper, although disclosed, could not be successfully made utilizing the Kyoritsu Yuki method which relies upon the inclusion of a cationic monomers having hydrophobic quaternary ammonium groups. Anionic polymers of course can not be prepared which include such functionality without detracting from the performance of the resultant polymer which is based on the anionic character of the polymer.

Copending application Ser. No. 08/620,051 filed Mar. 20, 1996, discloses and claims a method for the manufacture of a particular anionic water soluble polymer in dispersion form. This disclosure teaches that certain anionic polymers, incorporating hydrophobically modified monomers, can be prepared using dispersion polymer methods. The application specifically teaches the manufacture of acrylic acid-ethylhexylacrylate polymers. The ethylhexylacrylate monomer adds a hydrophobic character to the polymer, causing the polymer to become insoluble in certain brine solutions. While these polymers, and the methods for their manufacture are useful, the incorporation of a hydrophobic monomer into a water soluble polymer, where water solubility is desirable is not always advantageous in the final use of the polymer.

In the process of dispersion polymerization, the monomer and the initiator are both soluble in the polymerization medium, but the medium is a poor solvent for the resulting polymer. Accordingly, the reaction mixture is homogeneous at the onset, and the polymerization is initiated in a homogeneous solution. Depending on the solvency of the medium for the resulting oligomers or macroradicals and macromolecules, phase separation occurs at an early stage. This leads to nucleation and the formation of primary particles called "precursors" and the precursors are colloidally stabilized by adsorption of stabilizers. The particles are believed to be swollen by the polymerization medium and/or the monomer, leading to the formation of spherical particles having a size in the region of ~0.1–10.0 microns.

In any dispersion polymerization, the variables that are usually controlled are the concentrations of the stabilizer, the monomer and the initiator, solvency of the dispersion medium, and the reaction temperature. It has been found that these variables can have a significant effect on the particle size, the molecular weight of the final polymer particles, and the kinetics of the polymerization process.

Particles produced by dispersion polymerization in the absence of any stabilizer are not sufficiently stable and may coagulate after their formation. Addition of a small percentage of a suitable stabilizer to the polymerization mixture produces stable dispersion particles. Particle stabilization in dispersion polymerization is usually referred to as "steric stabilization". Good stabilizers for dispersion polymerization are polymer or oligomer compounds with low solubility in the polymerization medium and moderate affinity for the polymer particles.

As the stabilizer concentration is increased, the particle size decreases, which implies that the number of nuclei formed increases with increasing stabilizer concentration. The coagulation nucleation theory very well accounts for the observed dependence of the particle size on stabilizer concentration, since the greater the concentration of th stabilizer adsorbed the slower will be the coagulation step. This results in more precursors becoming mature particles, thus reducing the size of particles produced.

As the solvency of the dispersion medium increases, (a) the oligomers will grow to a larger MW before they become a precursor nuclei, (b) the anchoring of the stabilizer moiety will probably be reduced and (c) the particle size increases. As the initiator concentration is increased, it has been observed that the final particle size increases. As for the kinetics, it is reported that when the dispersion medium is a non-solvent for the polymer being formed, then the locus of polymerization is largely within the growing particles and the system follows the bulk polymerization kinetics, n (the kinetic chain length)=$R_p/R_t$, where $R_p$ is the propagation rate and $R_t$ is the termination rate. As the solvency of the dispersion medium for the growing polymer particle is increased, polymer growth proceeds in solution. The polymeric radicals that are formed in solution are then captured by growing particles. Consequently, the locus of the particle polymerization process changes and there is a concomitant change in the kinetics of polymerization. While earlier attempts have attempted to manufacture dispersion polymers of anionic or nonionic monomers through the incorporation of monomers having a hydrophobic character, we have found that anionic and nonionic water soluble dispersion polymers can be prepared which are stable, of high molecular weight, and which do not contain monomers having a hydrophobic character.

Accordingly, this invention is directed to the manufacture of nonionic and anionically charged water soluble polymers, in dispersion form, which do not necessarily require the inclusion of a hydrophobically modified monomer. This invention is directed to a composition, and method for the manufacture of high molecular weight, nonionic and anionically charged, water soluble vinyl addition polymers in aqueous dispersion form. The polymers include, and are made utilizing certain water soluble anionically charged vinyl addition polymer dispersants. The unique aspect of the polymers of this invention is that the polymers are prepared without the inclusion of a monomer which would decrease the water solubility of the resultant polymer material, that is to say that there is no inclusion of a monomer which would have hydrophobic characteristics. As a result of the invention, aqueous salt dispersions of water soluble anionic and nonionic polymers can be prepared without the inclusion of a hydrophobic monomer component.

It is accordingly an object of this invention to provide novel aqueous dispersions of water soluble nonionic and anionically modified water soluble polymers.

It is also an object of this invention to provide a novel method for the preparation of both nonionic and anionic water soluble vinyl addition polymers. Further objects will appear hereinafter.

THE INVENTION

The novel dispersion polymers of this invention include from about:

a) 5 to about 50 weight percent of a water soluble anionically charged polymer having been prepared by polymerizing under free radical forming conditions at a pH value of from about 2 to about 5:
  i. 0–100 mole percent of an anionically charged vinyl monomer; and,
  ii 100–0 mole percent of a nonionic vinyl monomer in the presence of
b) from about 0.1 to about 5 weight percent, based on the total weight of the dispersion, of a stabilizer selected from the group consisting of an anionically charged water soluble polymer having an intrinsic viscosity in 1M $NaNO_3$ of from about 0.5 to 7.0 dl/g.
c) from about 5 to about 40 weight percent based, on the total weight of the dispersion of a water soluble salt selected from the group consisting of ammonium, alkali metal and alkaline earth metal halides, sulfates, and phosphates; and,
d) balance water, said dispersion being characterized as having a bulk Brookfield viscosity of from about 10 to about 25,000 cps at 25° C.

The Vinyl Addition Monomers

The anionically charged vinyl addition monomers useful in this invention may be selected from a broad group. The monomers should have vinyl or allyl functionality, and contain a carboxyl, phosphonate, sulfonate, or other anionically charged group, or the corresponding alkali metal alkaline earth metal or ammonium salt of such monomer.

Examples of suitable monomers include acrylic acid, methacrylic acid, acrylamidomethylpropanesulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and water soluble alkali metal, alkaline earth metal, and ammonium, salts thereof. It will be seen by those skilled in the art that the subject invention is not limited to any particular anionically charged vinyl monomer, and that the choice of monomer will be based upon several factors including the ability of the monomer to polymerize with any other comonomer selected, the use of the produced polymer, and cost. Of particular importance, and a preferred anionic monomer in the practice of this invention is acrylic acid, its alkali metal and ammonium salts. In certain situations it may be possible to chemically modify a non-ionic monomer component contained in the dispersion polymer of the invention after polymerization to obtain an anionic functional group, for example, the modification of an incorporated acrylamide mer unit to the corresponding sulfonate or phosphonate.

The nonionic monomer useful in this invention may be any water soluble allyl or vinyl monomer having no substantial anionic or cationic charge. Preferred monomers of this class include acrylamide and methacrylamide, N-isopropylacrylamide, N-t-butyl acrylamide, and N-methylolacrylamide. A preferred nonionic vinyl monomer is acrylamide. Again, other nonionic monomers may be utilized without departing from the spirit and intent of the invention.

The water soluble vinyl addition polymer may accordingly contain from 0–100 mole percent of the anionic water soluble monomer, and preferably from about 5 to about 100 mole percent and most preferably from about 7 to about 100 mole percent of an anionic monomer. As will be accordingly be seen, aqueous dispersion homopolymers of anionic monomers, and especially acrylic acid can be obtained in accordance with this invention. Correspondingly, the nonionic monomer is generally present at a level of from 0 to about 100 mole percent, and preferably from about 1 to about 95 mole percent. Most preferably from about 5 to about 70 mole percent of the polymer may be the nonionic monomer. As can be seen the dispersion polymers of this invention encompass not only anionically charged polymers, but also nonionic polymers such as polyacrylamide.

The total amount of water soluble polymer prepared from the anionic and the nonionic water soluble monomers in the dispersion may vary from about 5 to about 50 percent by weight of the total weight of the dispersion, and preferably from about 10 to about 40 percent by weight of the dispersion. Most preferably the dispersion contains from about 15 to about 30 percent by weight of the polymer prepared from the nonionic and anionic water soluble monomers.

The Stabilizer

The dispersion polymers of the instant invention contain from about 0.1 to about 5 weight percent based on the total weight of the dispersion of a stabilizer selected from the group consisting of an anionically charged water soluble polymer having a molecular weight ranging from about 100,000 to about 5,000,000 and preferably from about 1,000,000 to about 3,000,000. The stabilizer polymer must be soluble in the salt solution, and must be soluble in water. The stabilizer polymers of the invention generally will have an intrinsic viscosity in 1M $NaNO_3$ of from about 0.1–10 dl/g and preferably have an intrinsic viscosity ranging from abut 0.5–7.0 dl/g. Most preferably the stabilizer polymers have an intrinsic viscosity of from about 2.0–6.0 dl/g at 30° C. Optionally, the stabilizer polymer may be slightly insoluble in the salt solution, i.e.: having some hydrophobic properties. A particularly useful water soluble polymer stabilizer is an anionically charged water soluble polymer which is soluble in water, and soluble or slightly soluble in the salt solution. Preferred stabilizers are polymers and copolymers of acrylamidomethylpropane sulfonic acid, said polymer containing at least 20 mole percent acrylamidomethylpropane sulfonic acid. These polymers may be made using conventional polymerization techniques, either in solution, or water-in-oil emulsion form. Optionally, the polymers may be prepared in accordance with the instant invention. The choice of a particular stabilizer polymer will be based upon the particular polymer being produced, the particular salts contained in the salt solution, and the other reaction conditions to which the dispersion is subjected during the formation of the polymer. In a preferred embodiment of the invention from about 0.1 to about 5 percent by weight, based on the weight of the total dispersion or product, of the stabilizer polymer is utilized. Preferably from about 0.25 to about 1.5 percent by weight based on the total weight of the dispersion or product is utilized, and most preferably, from about 0.4 to about 1.25 percent by weight stabilizer is utilized based on the weight of the total dispersion or finished product.

One of the parameters for making the stable polymer dispersions of the present invention is that the pH of the dispersion during the formation of the polymer must be within the range of from about 2 to about 5 and preferably from about 2.5 to about 4.5. Most preferably, the pH value of the dispersion during polymerization is between about 2.75 to about 4.25. The pH of the polymerization has been found to be critical in the formation of the stable polymers of the invention. After polymerization the pH of the dispersion may be adjusted to any desired value as long as the polymer remains insoluble to maintain the dispersed nature. Conducting the polymerization step at the pH values specified is believed to be important because of the decreased water solubility of the anionically charged monomers at these values. Polymer dispersions prepared in the absence of the stabilizer component of the invention resulted in paste like slurries indicating that a stable dispersion did not form. The paste like products generally thickened within a relatively short period of time into a mass that could not be pumped or handled within the general applications in which polymers of this type are employed.

The Salt Solution

The remainder of the dispersion consists of an aqueous solution comprising from about 2 to about 40 weight percent based on the total weight of the dispersion of a water soluble salt selected from the group consisting of ammonium, alkali metal and alkaline earth metal halides, sulfates, and phosphates. The salt is important in that the polymer produced in such aqueous media will be rendered insoluble on formation, and the polymerization will accordingly produce particles of water soluble polymer when suitable agitation is provided. The selection of the particular salt to be utilized is dependent upon the particular polymer to be produced, and the stabilizer to be employed. The selection of salt, and the amount of salt present should be made so that the polymer being produced will be insoluble in the salt solution. Particularly effective water soluble salts for use in the invention include a mixture of ammonium sulfate and sodium sulfate in such quantity to saturate the aqueous solution. While sodium sulfate may be utilized alone, we have found that it alters the precipitation process during the polymerization. Salts containing di or tri valent anions are preferred for use in the invention because of their reduced solubility in water as compared to for example alkali, alkaline earth, or ammonium halide salts although monovalent anion salts may be employed in certain circumstances. The use accordingly of salts containing di or tri valent anions generally results in polymer dispersions having lower percentages of salt materials as compared to salts containing monovalent anions.

It will be seen by those skilled in the art that the selection of particular salt can be made by preparing a saturated solution of the salt or salts, and determining the solubility of the desired stabilizer and the desired polymer. In a preferred embodiment of the invention from 5–30 weight percent based on the weight of the dispersion of the salt, will be utilized. Preferably, 5–25 weight percent of the dispersion will be salt, and most preferably 8–20 weight percent of the dispersion will be salt. When using higher quantities of monomer less salt will be required.

In addition to the above, other ingredients may be employed in making the polymer dispersions of the present invention. These additional ingredients may include chelating agents designed to remove metallic impurities from interfering with the activity of the free radical catalyst employed, chain transfer agents to regulate molecular weight, nucleating agents, and codispersant materials. Nucleating agents when utilized generally encompass a small amount of the same polymer to be produced. Thus if a polymer containing 70 mole percent acrylic acid (or its water soluble salts) and 30 percent acrylamide were to be produced, a nucleating agent or "seed" of the same or similar polymer composition may be utilized at a level of from 0–10 weight percent of the polymer contained in the dispersion, and generally 0.1–5 weight percent based on the polymer. Preferably from 0.5–4 weight percent of a nucleating agent is used based on the polymer contained in the dispersion. Most preferably from 0.75–2 weight percent based on the water soluble nonionic or anionic polymer to be produced in the dispersion.

Codispersant materials to be utilized include dispersants from the classes consisting of water soluble sugars, polyethylene glycols having a molecular weight of from about 2000 to about 50,000, and other polyhydric alcohol type materials. Amines and polyamines having from 2–12 carbon atoms are often times also useful as codispersant materials, but, must be used with caution because they may also act as chain transfer agents during the polymerization. The function of a codispersant is to act as a colloidal stabilizer during the early stages of the polymerization. The use of codispersant materials is optional, and not required to obtain the polymer dispersions of the invention. When utilized, the codispersant is present at a level of from 0–10 and generally from 0.5 weight percent of the dispersion. When utilized, the codispersant is preferably from 0.1–4 weight percent. Most preferably, when utilized, the codispersant is present at a level of from 0.2–2 weight percent based on the dispersion.

The Method

The dispersion polymers of the instant invention are generally prepared by first mixing the ingredients noted above, and, then subjecting the mixture to free radical forming conditions with agitation. Preferably, the polymerization is conducted under an inert atmosphere to exclude oxygen, and under sufficient agitation to maintain a dispersion. The dispersion polymers of the instant invention typically have bulk solution viscosities of less than about 25,000 cps at 25° C. (Brookfield), and most preferably have a viscosity of less than 5,000 cps. Most preferably the dispersions of the invention have viscosities of less than about 2,000 cps. At these viscosities, the polymer dispersions are easily handled in conventional polymerization equipment. The dispersion polymers of the invention typically have molecular weights ranging from about 50,000 to about 50 million, and most preferably a lower molecular weight of about 1,000,000 to as high as possibly attainable while maintaining water solubility of the finished product. Below a desired molecular weight of about 50,000 it is often more efficient to manufacture polymers of the type described herein in conventional solution form although, dispersion polymers of the type described herein can be manufactured at molecular weights of below about 50,000 with careful selection of chain transfer agent, catalyst, catalyst amount, and reaction conditions.

As stated above, the upper limit for molecular weight is limited only by solubility considerations for the polymeric materials being prepared. In a preferred method of practicing the invention the pH of the dispersion prior to polymerization is adjusted to between 2 and 5 and preferably 2.5 and 4.5 prior to polymerization and maintained within this range during the polymerization. The pH of the resultant polymer dispersion may be adjusted to any pH value after the polymerization step so long as the resultant dispersion remains stable.

The dispersion may be polymerized using any number of well known free radical catalysts. Red-ox catalysts may be utilized, or alternatively, and preferably, materials which generate free radicals in aqueous solution can be utilized to conduct the polymerization. A preferred class of materials useful in the polymerization of the subject invention are available from the Wako Chemical Company. Those skilled in the art of aqueous polymerization techniques will readily appreciate the fact that for certain polymerizations and for certain monomers, the monomers may be mixed together with the water, salt and stabilizer prior to the polymerization, while in other polymerizations it may be useful to add either one of the monomers, or both monomers stepwise during the polymerization in order to obtain proper incorporation of the monomers into the resultant dispersion polymer. The polymerizations of the subject invention may be run at temperatures ranging from −10° C. to as high as the boiling point of the monomers employed. In a preferred embodiment of the invention the dispersion polymerizations are conducted at temperatures ranging from −10°C. to 80° C. In a preferred embodiment, the temperature of the reaction is generally held at about 30° and 45° C.

In order to exemplify the invention, the following examples are presented.

EXAMPLE 1

This Examples illustrates the preparation of the polymeric stabilizer useful in the preparation of the polymers of the invention.

To a 2.0 liter resin reactor equipped with stirrer, temperature controller, and water cooled condenser was added 344.8 grams of a 58% by weight aqueous solution of acrylamidomethylpropane sulfonic acid, 657.4 grams of deionized water, and 0.2 grams of EDTA. The mixture was heated to 45° C. and 0.10 grams of 2,2' Azobis(2-amidopropane) dihydrochloride catalyst was added. The resulting solution was sparged with 1000 cc/min of nitrogen gas. After 15 minutes, polymerization began and the solution became viscous. After 14 hours the mixture became a very viscous clear solution. Thereafter the reactor was heated to 80° C. and held at that temperature for four hours. To this mixture was then added 666.6 grams of deionized water and the mixture recovered. A 12.0% by weight actives solution of polyacrylamidomethylpropane sulfonic acid was recovered. The polymer had an intrinsic viscosity of 3.73 dL/g when measured in 1.0 molar $NaNO_3$.

EXAMPLE 2

This example illustrates the preparation of the polymeric dispersion of the instant invention.

To a 1.5-liter resin reactor equipped with stirrer, temperature controller, and water cooled condenser, was added 479.66 grams of deionized water, 71.27 grams of sodium sulfate, 92.78 grams of sodium chloride, 12 grams of glycerol, 30 grams of a 15% solution of polyacrylamidomethylpropane sulfonic acid having been prepared in a manner similar to Example 1 having an intrinsic viscosity of 3.93 dl/gm, 212.07 grams of a 49.6% solution of acrylamide (1.50 moles), 45.44 grams of acrylic acid (0.63 moles), 4.03 grams of a 50% solution of sodium hydroxide, and 0.25 grams of EDTA (ethylenediaminetetraaceticacid sodium salt). The mixture was heated to 34° C. and 0.50 grams of a 4% solution of 2,2' Azobis(N,N'-dimethylene isobutryamidine) dihydrochloride was added. The resulting solution was sparged with 1000 cc/minute of Nitrogen. After 45 minutes, polymerization began and the solution became viscous. After 2 hours the mixture became a milky dispersion. After 7 hours 2.00 gms of a 4% solution of 2,2' Azobis(N,N' dimethylene isobutryamidine) dihydrochloride was added. The reaction was continued for a total of 24 hours, during which time the temperature was maintained at 32°–36° C. To the above dispersion was added 50 grams of ammonium sulfate. The resulting polymer dispersion had a Brookfield viscosity of 563 cps, a pH of 3.00, and contained 15% of a 70/30 copolymer of acrylamide and acrylic acid with an reduced specific viscosity of 27.3 dl/gm in 1.0 molar NaNO3.

EXAMPLE 3

To a 1.5-liter resin reactor equipped with stirrer, temperature controller, and water cooled condenser, was added 486.66 grams of deionized water, 71.27 grams of sodium sulfate, 92.78 grams of ammonium sulfate, 15 grams of glycerol, 50 grams of a 12% solution of polyacrylamidomethylpropane sulfonic acid having an intrinsic viscosity of 3.84 dl/gm, and prepared in a manner similar to that described in Example 1, 212.07 grams of a 49.6% solution of acrylamide (1.50 moles), 45.44 grams of acrylic acid (0.63 moles), 4.03 grams of a 50% solution of sodium hydroxide, and 0.25 grams of EDTA. The mixture was heated to 34° C. and 0.50 grams of a 4% solution of 2,2' Azobis(N,N'-dimethylene isobutryamidine) dihydrochloride was added. The resulting solution was sparged with 1000 cc/min. of Nitrogen. After 30 minutes, polymerization began and the solution became viscous. After 1 hour the mixture became a milky dispersion. After 6 hours 0.50 grams of a 4% solution of 2,2' Azobis(N,N'-dimethylene isobutryamidine) dihydrochloride was added. After 7.5 hours 1.50 gms of a 4% solution of 2,2' Azobis(N,N'-dimethylene isobutryramidine) dihydrochloride was added. The reaction was continued for a total of 24 hours, during which time the temperature was maintained at 32°–36° C. The resulting polymer dispersion had a Brookfield viscosity of 1800 cps. To the above dispersion was added 20 grams of ammonium sulfate. The resulting dispersion had a Brookfield viscosity of 185 cps, a pH of 3.35, and contained 15% of a 70/30 copolymer of acrylamide and acrylic acid with a reduced specific viscosity of 30.4 dl/gm in 1.0 molar $NaNO_3$.

EXAMPLE 4

To a 1.5-liter resin reactor equipped with stirrer, temperature controller, and water cooled condenser, was added 501.06 grams of deionized water, 71.27 grams of sodium sulfate, 92.78 grams of ammonium sulfate, 0.60 grams of sodium formate, 50 grams of a 12% solution of polyacrylamidomethylpropane sulfonic acid having an intrinsic viscosity of 3.84 dl/gm, and prepared in a manner similar to that described in Example 1, 212.07 grams of a 49.6% solution of acrylamide (1.50 moles), 45.44 grams of acrylic acid (0.63 moles), 4.03 grams of a 50% solution of sodium hydroxide, and 0.25 grams of EDTA. The mixture was heated to 34° C. and 0.50 grams of a 4% solution of 2,2' Azobis(N,N' dimethylene isobutryramidine) dihydrochloride was added. The resulting solution was sparged with 1000 cc/min. of Nitrogen. After 30 minutes, polymerization began and the solution became viscous. After 2 hours the mixture became a milky dispersion. After 3 hours 0.50 grams of a 4% solution of 2,2' Azobis(N,N'-dimethylene isobutryramidine) dihydrochloride was added. After 7.5 hours 1.50 grams of a 4% solution of 2,2' Azobis(N,N'-dimethylene isobutryramidine) dihydrochloride was added. The reaction was continued for a total of 24 hours during which time the temperature was maintained at 32°–36° C. The resulting polymer dispersion had a Brookfield viscosity of 325 cps. To the above dispersion was added 20 grams of ammonium sulfate. The resulting dispersion had a Brookfield viscosity of 150 cps, a pH of 3.63, and contained 15% of a 70/30 copolymer of acrylamide and acrylic acid with a reduced specific viscosity of 25.2 dl/gm in 1.0 molar $NaNO_3$.

EXAMPLE 5

To a 1.5-liter resin reactor equipped with stirrer, temperature controller, and water cooled condenser, was added 405.61 grams of deionized water, 62.56 grams of sodium sulfate, 81.44 grams of ammonium sulfate, 20 grams of glycerol, 50 grams of a 12% solution of polyacrylamidomethylpropane sulfonic acid having an intrinsic viscosity of 3.84 dl/gm, and prepared in a manner similar to that described in Example 1, 281.88 grams of a 49.6% solution of acrylamide (1.967 moles), 60.33 grams of acrylic acid (0.837 moles), 5.35 grams of a 50% solution of sodium hydroxide, and 0.33 grams of EDTA. The mixture was heated to 34° C. and 0.50 grams of a 4% solution of 2,2' Azobis(N,N'-dimethylene isobutryramidine) dihydrochloride was added. The resulting solution was sparged with 1000 cc/min. of Nitrogen. After 30 minutes, polymerization began and the solution became viscous. After 3 hours the mixture became a milky dispersion. After 4.5 hours 0.50 grams of a 4% solution of 2,2' Azobis(N,N'-dimethylene isobutryramidine) dihydrochloride was added. After 8 hours 1.50 grams of a 4% solution of 2,2' Azobis(N,N'-dimethylene isobutryramidine) dihydrochloride was added. The reaction was continued for a total of 24 hours, during which time the temperature was maintained at 32°–36° C. The resulting polymer dispersion had a Brookfield viscosity of 2900 cps. To the above dispersion was added 30 grams of ammonium sulfate. The resulting dispersion had a Brookfield viscosity of 335 cps, a pH of 3.53, and contained 20% of a 70/30 copolymer of acrylamide and acrylic acid with a reduced specific viscosity of 26.0 dl/gm in 1.0 molar $NaNO_3$.

EXAMPLE 6

To a 1.5-liter resin reactor equipped with stirrer, temperature controller, and water cooled condenser, was added 428.86 grams of deionized water, 62.56 grams of sodium sulfate, 81.44 grams of ammonium sulfate, 1.67 grams of sodium formate, 0.44 grams of 98% sulfuric acid, 50 grams of the dispersant prepared in Example 1, 281.88 grams of a 49.6% solution of acrylamide (1.967 moles), 60.33 grams of acrylic acid (0.837 moles), and 0.33 grams of EDTA. The mixture was heated to 34° C. and 0.25 gms of a 4% solution of 2,2' Azobis(N,N'-dimethylene isobutryamidine) dihydrochloride was added. The resulting solution was sparged with 1000 cc/min. of Nitrogen. After 30 minutes, polymerization began and the solution became viscous. After 3 hours the mixture became a milky dispersion. After 8 hours 1.50 grams of a 4% solution of 2,2' Azobis(N,N'-dimethylene isobutryamidine) dihydrochloride was added. The reaction was continued for a total of 24 hours, during which time the temperature was maintained at 32°–40° C. To the above dispersion was added 30 grams of ammonium sulfate. The resulting dispersion had a Brookfield viscosity of 1335 cps, a pH of 2.92, and contained 20% of a 70/30 copolymer of acrylamide and acrylic acid with a reduced specific viscosity of 29.0 dl/gm in 1.0 molar $NaNO_3$.

EXAMPLE 7

To a 1.5-liter resin reactor equipped with stirrer, temperature controller, and water cooled condenser, was added 321.00 grams of deionized water, 56.48 grams of sodium sulfate, 73.52 grams of ammonium sulfate, 25 grams of glycerol, 62.5 grams of a 12% solution of polyacrylamidomethylpropane sulfonic acid having an intrinsic viscosity of 3.84 dl/gm, and prepared in a manner similar to that described in Example 1, 352.82 grams of a 49.6% solution of acrylamide (2.46 moles), 75.76 grams of acrylic acid (1.05 moles), and 0.42 grams of EDTA. The mixture was heated to 34° C. and 0.75 grams of a 4% solution of 2,2' Azobis(N,N'-dimethylene isobutryamidine) dihydrochloride was added. The resulting solution was sparged with 1000 cc/min. of Nitrogen. After 120 minutes, polymerization began and the solution became viscous. After 7 hours the mixture became a milky dough and 0.25 grams of a 4% solution of 2,2' Azobis(N,N'-dimethylene isobutryamidine) dihydrochloride was added. After 24 hours the reaction mixture had become a milky dispersion and 1.50 grams of a 4% solution of 2,2' Azobis(N,N'-dimethylene isobutryamidine) dihydrochloride was added. The reaction was continued for an additional 7 hours, during which time the temperature was maintained at 32°–36° C. To the above dispersion was added 30 grams of ammonium sulfate. The resulting dispersion had a Brookfield viscosity of 775 cps, a pH of 2.95, and contained 25% of a 70/30 copolymer of acrylamide and acrylic acid with a reduced specific viscosity of 21.9 dl/gm in 1.0 molar $NaNO_3$.

EXAMPLE 8

To a 1.5-liter resin reactor equipped with stirrer, temperature controller, and water cooled condenser, was added 340.86 grams of deionized water, 56.48 grams of sodium sulfate, 73.52 grams of ammonium sulfate, 3.00 grams of sodium formate, 2.14 grams of 98% sulfuric acid, 62.5 grams of the dispersant prepared in Example 1, 352.82 grams of a 49.6% solution of acrylamide (2.46 moles), 75.76 grams of acrylic acid (1.05 moles), and 0.42 grams of EDTA. The mixture was heated to 34° C. and 0.25 gms of a 4% solution of 2,2' Azobis(N,N'-dimethylene isobutryamidine) dihydrochloride was added. The resulting solution was sparged with 1000 cc/min. of Nitrogen. After 60 minutes, polymerization began and the solution became viscous. After 90 minutes a second 0.25 grams of a 4% solution of 2,2' Azobis(N,N'-dimethylene isobutryramidine) dihydrochloride was added. After 180 minutes a third 0.25 grams of a 4% solution of 2,2' Azobis(N,N'-dimethylene isobutryamidine) dihydrochloride was added. After 360 minutes a forth 0.25 grams of a 4% solution of 2,2' Azobis (N,N'-dimethylene isobutyramidine) dihydrochloride was added. After 7 hours the mixture became a milky dough. After 24 hours the reaction mixture had become a milky dispersion and 1.50 grams of a 4% solution of 2,2' Azobis (N,N'-dimethylene isobutryamidine) dihydrochloride was added. The reaction was continued for an additional 4 hours, during which time the temperature was maintained at 40°–48° C. To the above dispersion was added 30 grams of ammonium sulfate. The resulting dispersion had a Brookfield viscosity of 610 cps, a pH of 2.90, and contained 25% of a 70/30 copolymer of acrylamide and acrylic acid with a reduced specific viscosity of 12.7 dl/gm in 1.0 molar NaNO$_3$.

EXAMPLE 9

To a 1.5-liter resin reactor equipped with stirrer, temperature controller, and water cooled condenser, was added 420.77 grams of deionized water, 100.00 grams of sodium sulfate, 100.00 grams of ammonium sulfate, 15 grams of glycerol, 50 grams of a 12% solution of polyacrylamidomethylpropane sulfonic acid having an intrinsic viscosity of 3.84 dl/gm, and prepared in a manner similar to that described in Example 1, 281.00 grams of a 49.6% solution of acrylamide (1.96 moles), 8.05 grams of acrylic acid (0.112 moles), and 0.10 grams of EDTA. The mixture was heated to 34° C. and 0.50 grams of a 4% solution of 2,2' Azobis(N,N'-dimethylene isobutryamidine) dihydrochloride was added. The resulting solution was sparged with 1000 cc/min. of Nitrogen. After 20 minutes, polymerization began and the solution became viscous. After 1.5 hours the mixture became a milky dispersion. During the next 4.5 hours 2.58 grams of acrylic acid (0.36 moles) were added to the reaction mixture. After 4 hours 0.50 grams of a 4% solution of 2,2' Azobis(N,N'-dimethylene isobutryamidine) dihydrochloride was added. After 8 hours 1.50 grams of a 4% solution of 2,2' Azobis(N,N' dimethylene isobutryamidine) dihydrochloride was added. The reaction was continued for a total of 24 hours, during which time the temperature was maintained at 32°–36° C. The resulting polymer dispersion had a Brookfield viscosity of 4300 cps. To the above dispersion was added 20 grams of ammonium sulfate. The resulting dispersion (4252–162) had a Brookfield viscosity of 355 cps, a pH of 3.52, and contained 15% of a 93/07 copolymer of acrylamide and acrylic acid with a reduced specific viscosity of 20.5 dl/gm in 1.0 molar NaNO$_3$.

Table I, below gives a summary of Examples 1–8.

TABLE I

SUMMARY OF PROPERTIES - Examples 2–9

| Product | Poly % | (NH$_4$)$_2$ SO$_4$ % | Na$_2$SO$_4$ % | Acrylic Acid M % | Visc. cps. | RSV |
|---|---|---|---|---|---|---|
| Example 2 | 15 | 5.0 | 7.1 + 9.3* | 30 | 563 | 27.3 |
| Example 3 | 15 | 11.3 | 7.1 | 30 | 250 | 40.2 |
| Example 4 | 15 | 11.3 | 7.1 | 30 | 150 | 35.7 |
| Example 5 | 20 | 11.1 | 6.3 | 30 | 335 | 35.2 |
| Example 6 | 20 | 11.1 | 6.3 | 30 | 1335 | 38.5 |
| Example 7 | 25 | 10.4 | 5.6 | 30 | 775 | 30.5 |
| Example 8 | 25 | 10.4 | 5.6 | 30 | 610 | 16.2 |
| Example 9 | 15 | 12.0 | 10.1 | 7.0 | 355 | 20.5 |

*Includes 9.31% Sodium chloride.
RSV is reduced specific viscosity measured as a 0.045% by weight polymer solution in 1M Sodium Nitrate.
Acrylic Acid M % is the mole percentage of acrylic acid in the polymer.

EXAMPLE 10

To a 1.5-liter resin reactor equipped with stirrer, temperature controller, and water cooled condenser, was added 487.88 grams of deionized water, 105.00 grams of sodium sulfate, 135.0 grams of sodium chloride, 60 grams of a 15% solution of polyacrylamidomethylpropane sulfonic acid having an intrinsic viscosity of 3.76 dl/gm, and prepared in a manner similar to that described in Example 1, 128.04 grams of a 49.0% solution of acrylamide (0.883 moles), 27.26 grams of acrylic acid (0.378 moles). 2.70 grams of a 50% solution of sodium hydroxide, and 0.15 grams of EDTA. The mixture was heated to 45° C. and 1.00 grams of a 4% solution of 2,2' Azobis(2 amidinopropane) dihydrochloride was added. The resulting solution was sparged with 1000 cc/min. of Nitrogen. After 45 minutes, polymerization began and a milky dispersion was formed. Over the next 2 hours and 15 minutes the temperature was maintained at 45° C. and a solution containing 42.68 grams of 49.0% acrylamide (0.294 moles), 9.09 grams of acrylic acid (0.126 moles), 0.90 grams of 50% sodium hydroxide, and 0.05 grams of EDTA was pumped into the reactor using a syringe pump. The reaction was continued for 1 more hour at a temperature of 48° C. Then 0.25 grams of a 4% solution of 2,2' Azobis(2 amidinopropane) dihydrochloride was added. Finally the dispersion was reacted for 2 more hours at a temperature of 55° C. The resulting polymer dispersion had a Brookfield viscosity of 430 cps, a pH of 3.39, and contained 12% of a 70/30 copolymer of acrylamide and acrylic acid with a reduced specific viscosity of 31.0 dl/gm in 1.0 molar NaNO$_3$.

EXAMPLE 11

This examples illustrates the importance of incorporating a stabilizer into the reaction mixture. Without a stabilizer, the viscosity increased resulting in a polymeric dispersion resembling a paste.

To a 1-liter resin reactor equipped with stirrer, temperature controller, and water cooled condenser, was added 548.85 grams of deionized water, 86.8 grams of sodium sulfate, 154.4 grams of sodium chloride, 174.05 grams of a 44.8% solution of acrylamide (1.097 moles), 32.25 grams of acrylic acid (0.448 moles), 3.60 grams of a 50% solution of sodium hydroxide. The mixture was heated to 45° C. and 0.05 grams of 2,2' Azobis(2 amidinopropane) dihydrochloride was added. The resulting solution was sparged with 1000 cc/min. of Nitrogen. The reaction was continued for a total of 22 hours at 45° C. The resulting smooth white slurry had a Brookfield viscosity of 21000 cps and a pH of 3.0. and contained 11% of a 71/29 copolymer of acrylamide and acrylic acid with a reduced specific viscosity of 37.0 dl/gm in 1.0 molar $NaNO_3$. This material, prepared in the absence of the stabilizer resulted in a smooth white paste like slurry indicating that a stable dispersion did not form. This white paste thickened within a few hours and resulted in a mass that could not be handled in conventional applications in which this polymer is used.

EXAMPLE 12

This example illustrates the utility of the instant invention in the preparation of a homopolymer of acrylic acid.

To a 1.5-liter resin reactor equipped with stirrer, temperature controller, and water cooled condenser, was added 590.90 grams of deionized water, 80.0 grams of sodium sulfate, 140.0 grams of ammonium sulfate, 50.0 grams of 12% of the polymer of Example 1, and 20.0 grams of glycerol. In a beaker, 200 grams of acrylic acid, 5.35 grams of 50% aqueous sodium hydroxide solution, and 0.25 grams of EDTA were taken and mixed well. The contents of the beaker were transferred in to the reactor and then heated slowly to 32° C. while maintaining uniform mixing. After the reactor reached 32° C., 0.5 grams of a 4% aqueous solution of 2,2' Azobis(2 amidinopropane) dihydrochloride initiator was added. The resulting solution was sparged with 1000 cc/min. of Nitrogen. The reaction mixture became cloudy and slightly viscous. Sixty minutes after adding the initiator, an additional 0.25 grams of a 4% aqueous solution of 2,2' Azobis(2 amidinopropane) dihydrochloride initiator was added. The reaction was continued for a total of 24 hours at 32° C. Four 20 gram fractions of ammonium sulfate was added at reaction time 220, 240, 270, and 300 minutes to minimize the increase in the in-process viscosity and to maintain an effective mixing. Another 10 grams of ammonium sulfate was added at reaction time 420 minutes. After maintaining the reaction mixture at 32° C. for a total period of 24 hours, 1.75 grams of a 4% aqueous solution of 2,2' Azobis(2-amidinopropane) dihydrochloride initiator was added. The reaction was continued for another 24 hours (a total of 48 hours) at 32° C. The resulting smooth white viscous dispersion had a reduced specific viscosity of 14.4 dl/gm for a 0.045% polymer solution in 1.0 molar $NaNO_3$.

The results indicated above show the utility of the method discussed in the instant application in providing the novel anionically charged dispersion polymers. Each of the subject dispersions was stable for a sufficient period of time to allow, in a commercial setting, the transport of the material from a chemical manufacturing facility to an ultimate end user. Each of the dispersions produced in Examples 1–9 provided a polymeric material which would rapidly dissolve when the dispersion containing the polymer was added to water.

Several of the dispersions of Examples 1–9 were evaluated against commercially available water-in-oil emulsion polymers of approximately the same composition as coal dewatering flocculants. The polymers of the subject invention were overall more active than equivalent water-in-oil emulsion polymers.

While the examples presented above deal specifically with the preparation of copolymers of acrylic acid and acrylamide, and polyacrylic acid, the process of this invention will also work with other combinations of anionic and nonionic monomers, as well as homopolymers of anionic and/or nonionic vinyl or allyl monomers.

Having thus described our invention, we claim:

1. An aqueous dispersion of a particulate water soluble polymer comprising:

a) from about 5 to about 50 weight percent of a water soluble polymer having been prepared by polymerizing under free radical forming conditions at a pH value of from about 2 to about 5:
      i. 0–100 mole percent of at least one anionically charged water soluble vinyl monomer; and,
      ii. 100–0 mole percent of at least one nonionic vinyl monomer
   b) from about 0.1 to about 5 weight percent based on the total weight of the dispersion of a stabilizer selected from the group consisting of an anionically charged water soluble polymer having an intrinsic viscosity in 1M $NaNO_3$ of from about 0.1–10;
   c) from about 5 to about 40 weight percent based on the weight of the dispersion of a water soluble salt selected from the group consisting of ammonium, alkali metal and alkaline earth metal halides, sulfates, and phosphates; and
   d) balance water, said dispersion being characterized as having a bulk Brookfield viscosity of from about 10 to about 25,000 cps at 25 degrees C.

2. The aqueous dispersion of claim 1 wherein the anionically charged water soluble monomer is selected from the group consisting of acrylic acid, methacrylic acid, acrylamidomethylpropane sulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and water soluble alkali metal, alkaline earth metal, and ammonium, salts thereof.

3. The aqueous dispersion of claim 2 wherein the nonionic water soluble monomer is selected from the group consisting of acrylamide, methacrylamide, N-isopropylacrylamide, N-t-butyl acrylamide, and N-methylolacrylamide.

4. The aqueous dispersion of claim 1 wherein the anionic monomer is selected from the group consisting of acrylic acid and methacrylic acid and their corresponding alkali metal, alkaline earth metal, and ammonium salts and the nonionic monomer is acrylamide.

5. The aqueous dispersion of claim 1 wherein the wherein the stabilizer is selected from the group consisting of polymers and copolymers of acrylamidomethylpropane sulfonic acid containing at least 20 mole percent acrylamidomethylpropane sulfonic acid.

6. The aqueous dispersion of claim 1 containing from about 0 to about 10 weight percent based on the total weight of the dispersion of a codispersant selected from the group consisting of water soluble polyhydric alcohols; water soluble amines and polyamines having from 2–12 carbon atoms.

7. The aqueous dispersion of claim 1 including a nucleating agent wherein said nucleating agent is an anionically charged water soluble vinyl addition polymer and is present at a level of from about 0 to about 10 percent by weight based on the total weight of the dispersion.

8. The aqueous dispersion of claim 1 containing from about 15 to about 40 weight percent of a non-ionic or anionically charged water soluble polymer.

9. The aqueous dispersion of claim 1 containing from about 0.25 to about 2 weight percent, based on the weight of the total dispersion, of a stabilizer, and said stabilizer is selected from the group consisting of water soluble polymers and copolymers containing at least 20 mole percent of acrylamidomethylpropane sulfonic acid said stabilizer having an intrinsic viscosity in 1M $NaNO_3$ of from about 0.5–7.0 dl/g.

10. The aqueous dispersion of claim 4 wherein the water soluble polymer contains from 7–100 mole percent anionically charged monomer and from 0–93 mole percent of acrylamide, the stabilizer is a homopolymer of acrylamidomethylpropane sulfonic acid having an intrinsic viscosity in 1M $NaNO_3$ of from about 0.5–7.0 dl/g and the water soluble salt is a mixture of ammonium sulfate and sodium sulfate.

11. An aqueous dispersion of a particulate water soluble polymer comprising:
   a) from about 15 to about 40 weight percent of a water soluble polymer having been prepared by polymerizing under free radical forming conditions at a pH value of from about 2 to about 5:
      i. 0–100 mole percent of at least one anionically charged water soluble vinyl monomer and,
      ii 100–0 mole percent of at least one water soluble nonionic vinyl monomer
   b) from about 0.25 to about 2 weight percent based on the weight of the total dispersion of a stabilizer, said stabilizer selected from the group consisting of water soluble polymers and copolymers containing at least 50 mole percent of acrylamidomethylpropane sulfonic acid and having an intrinsic viscosity in 1M NaNO3 of from about 0.5–7.0 dl/g;
   c) from about 0.4 to about 2 weight percent based on the total weight of the dispersion of a codispersant selected from the group consisting of water soluble polyhydric alcohols, and water soluble amines and polyamines having from 2–12 carbon atoms;
   d) from about 12 to about 30 weight percent based on the total weight of the dispersion of a water soluble salt selected from the group consisting of ammonium, alkali metal and alkaline earth metal halides, sulfates, and phosphates; and,
   e) balance water.

12. A method for preparing an aqueous dispersion of a water soluble anionic polymer which comprises polymerizing under free radical forming conditions at a pH value of from about 2 to about 5:
   a) 5–50 weight percent of a mixture containing
      i. 0–100 mole percent of at least one water soluble anionically charged vinyl monomer; and,
      ii 100–0 mole percent of at least one water soluble nonionic vinyl monomer;
   b) from about 0.1 to about 5 weight percent based on the total weight of the dispersion of a stabilizer selected from the group consisting of anionically charged water soluble polymers having an intrinsic viscosity in 1M $NaNO_3$ of from about 0.1–10 dl/g;
   c. from about 5 to about 40 weight percent based on the total weight of the dispersion of a water soluble salt selected from the group consisting of ammonium, alkali metal and alkaline earth metal halides, sulfates, and phosphates; and
   d. balance water; and then recovering a dispersion of said water soluble polymer, said dispersion being characterized as having a viscosity of less than about 25,000 cps.

13. The process of claim 12 wherein the anionically charged water soluble monomer is selected from the group consisting of acrylic acid, methacrylic acid, acrylamidomethylpropane sulfonic acid, acryamidomethylbutanoic acid, maleic acid, fumaric acid, itaconic acid, vinyl sulfonic acid, styrene sulfonic acid, vinyl phosphonic acid, allyl sulfonic acid, allyl phosphonic acid, sulfomethylated acrylamide, phosphonomethylated acrylamide and water soluble alkali metal, alkaline earth metal, and ammonium, salts thereof.

14. The process of claim 12 wherein the nonionically charged water soluble monomer is selected from the group consisting of acrylamide, methacrylamide, N-isopropylacrylamide, N-t-butyl acrylamide, and N-methylolacrylamide.

15. The process of claim 12 wherein the anionic monomer is selected from the group consisting of acrylic acid and methacrylic acid and their corresponding alkali metal, alkaline earth metal, and ammonium salts and the nonionic monomer is acrylamide.

16. The process of claim 12 wherein the stabilizer is selected from the group consisting of anionically charged water soluble polymers having an intrinsic viscosity in 1M NaNO3 of from about 0.5–7 dl/g.

17. The process of claim 15 wherein the wherein the stabilizer is selected from the group consisting of polymers and copolymers of acrylamidomethylpropane sulfonic acid containing at least 20 mole percent acrylamidomethylpropane sulfonic acid.

18. The process of claim 15 wherein the mixture contains from 7–100 mole percent anionically charged monomer and from 0–93 mole percent of the nonionic monomer, the stabilizer is a homopolymer of acrylamidomethylpropane sulfonic acid having an intrinsic viscosity in 1M $NaNO_3$ of from about 0.5–7.0 dl/g and the water soluble salt is a mixture of ammonium sulfate and sodium sulfate.

* * * * *